United States Patent [19]

Elvin

[11] Patent Number: 4,806,512
[45] Date of Patent: Feb. 21, 1989

[54] VIRGIN CATALYST TREATMENT

[75] Inventor: Frank J. Elvin, Kenner, La.

[73] Assignee: ChemCat Corporation, New Orleans, La.

[21] Appl. No.: 50,875

[22] Filed: May 18, 1987

[51] Int. Cl.$^4$ .................. B01J 29/06; B01J 37/22; B01J 37/28

[52] U.S. Cl. .................................. 502/65; 502/85; 502/86

[58] Field of Search .............. 502/65, 73, 79, 85, 502/86

[56] References Cited

U.S. PATENT DOCUMENTS 3,345,135 10/1967 Kerr et al. .................... 502/79
4,104,152 8/1978 Hilfman .......................... 502/85

Primary Examiner—Carl F. Dees
Attorney, Agent, or Firm—Frank J. Uxa

[57] ABSTRACT

A process for treating a virgin catalyst useful to promote hydrocarbon conversion, e.g., cracking at hydrocarbon conversion, e.g., cracking, conditions comprising:

(a) contacting the virgin catalyst with a liquid reductive wash medium; and
(b) contacting the reductively washed virgin catalyst with a liquid oxidative wash medium, thereby producing a washed virgin catalyst with at least one improved catalytic property.

14 Claims, No Drawings

VIRGIN CATALYST TREATMENT

The present invention relates to treatment of virgin catalyst which is useful in hydrocarbon conversion service. More particularly, the invention relates to such a virgin catalyst treating process which involves improving at least one catalytic property of the virgin catalyst, and to a hydrocarbon conversion process utilizing such treated virgin catalyst.

Catalytically promoted processes for the chemical conversion of hydrocarbons include cracking, hydrocracking, reforming, hydrodenitrogenation, hydrodesulfurization, etc. Such reactions generally are performed at elevated temperatures, for example, about 300° F. to about 1200° F., more often about 600° F. to about 1000° F. Feedstocks to these processes comprise normally liquid and solid hydrocarbons which, at the temperature of the conversion reaction, are generally in the fluid, i.e., liquid or vapor, state, and the products of the conversion usually are more valuable, e.g., lower boiling, materials.

In particular, cracking of hydrocarbon feedstocks is widely practiced and uses a variety of solid catalysts to give more valuable end products, e.g., hydrocarbons of preferred octane rating boiling in the gasoline range. Cracking is ordinarily effected to produce gasoline as the most valuable product and is generally conducted at temperatures of about 750° F. to about 1100° F., preferably about 850° F. to about 950° F., at pressures up to about 2000 psig., preferably about atmospheric to about 100 psig. and without substantial addition of free hydrogen to the system. In cracking, the feedstock is usually a petroleum hydrocarbon fraction such as straight run or recycle gas oils or other normally liquid hydrocarbons boiling above the gasoline range.

The present invention relates to an improvement in virgin catalyst performance in hydrocarbon conversion. As used herein, the term "virgin" catalyst or "fresh" catalyst refers to a catalyst which has not previously been used to promote the hydrocarbon conversion for which it is designed or manufactured. Virgin or fresh catalyst can be contrasted with spent catalyst, which has been used to the point where it has little or no useful catalytic activity remaining, and with equilibrium catalyst, which has been used and replenished so that a substantially steady state level of catalytic activity is maintained. Virgin catalyst, e.g., such as that processed in accordance with the present invention, may be used to maintain the catalytic activity of the equilibrium catalyst.

Virgin or fresh catalysts often have substantially higher catalytic activity than equilibrium catalysts. However, this increased activity may result in undesired, non-selective reactions. For example, virgin catalytic cracking catalysts often produce more undesirable products, e.g., coke and light gases, relative to equilibrium cracking catalysts. It would clearly be advantageous to provide a process to provide virgin catalysts with at least one improved catalytic property.

Many patents have issued disclosing various approaches to removing metals from used hydrocarbon conversion catalysts and then returning the demetallized catalyst to hydrocarbon conversion service. Certain of these patents involve chlorinating metal contaminated alumina, silica-alumina and silica catalysts at elevated temperatures. See, for example, U.S. Pat. Nos. 3,150,104; 3,122,510; 3,219,586; and 3,182,025 each of which is incorporated in its entirety herein by reference. In certain instances, prior patents have taught the use of liquid aqueous compositions containing ammonium ion to remove vanadium from the used, oxide-based catalyst and/or to at least partially neutralize the chlorine and/or hydrogen chloride which exists with the used, chlorinated, oxide-based catalyst. In the more recent past, other used catalyst demetallization processes have been suggested. See, for example, U.S. Pat. Nos. 4,101,444; 4,163,709; 4,163,710; 4,243,550 and related patents, and commonly assigned U.S. patent application Ser. Nos. 881,334, filed July 2, 1986, and 895,130, filed Aug. 11, 1986, each of which patents and applications is incorporated in its entirety herein by reference.

Such used catalyst demetallization processes are not concerned with virgin catalysts, which have not seen hydrocarbon conversion service and, therefore, have not been contaminated with metals during such service. In fact, virgin catalysts are often produced to be substantially free of poisons, e.g., metal components which have an undue detrimental effect on the desired hydrocarbon conversion.

Therefore, one object of the present invention is to provide a process for treating a virgin catalyst useful to promote hydrocarbon conversion.

Another object of the present invention is to provide a hydrocarbon conversion process utilizing, as at least a portion of the catalyst, a treated virgin catalyst. Other objects and advantages of the present invention will become apparent hereinafter.

A process for treating a virgin catalyst useful to promote the conversion of a substantially hydrocarbon feedstock has been discovered. In one broad aspect, the present treating process comprises (a) contacting the virgin catalyst with a liquid, preferably aqueous, reductive wash medium; and (b) contacting the reductively washed virgin catalyst with a liquid, preferably aqueous, oxidative wash medium. The resulting washed virgin catalyst has at least one improved, i.e., relative to the virgin catalyst prior to step (a), catalytic property.

The present invention provides substantial and surprising benefits. For example, the present process can often be conducted simply and inexpensively, thus providing a relatively easy to operate and cost effective approach to improve virgin catalyst performance. Also, the present process can be effectively controlled to provide for controlled conditioning of virgin catalysts, as desired.

The composition of the virgin catalysts to be treated in the present invention may vary widely, provided that such catalysts are capable of promoting the desired hydrocarbon conversion. The particular chemical make-up of the virgin catalyst is dependent, for example, on the type of hydrocarbon chemical conversion desired. Thus, the virgin catalysts suitable for treatment in the present invention often comprise at least one of the natural or synthetic materials which are capable of promoting the desired hydrocarbon conversion. For example, when the desired hydrocarbon conversion involves one or more of hydrocarbon cracking (preferably in the substantial absence of added free molecular hydrogen), disproportionation, isomerization, hydrocracking, reforming, dehydrocyclization, polymerization, alkylation and dealkylation, such suitable materials include acid-treated natural clays, such as montmorillonite, kaolin and bentonite clays; natural or synthetic amorphous materials, such as alumina, silica, silica-alumina, silica-magnesia and silica-zirconia composites; crystalline materials; and mixtures thereof.

The virgin catalysts to be treated in the present invention preferably comprise at least one synthetic crystalline material in an amount effective to promote the desired hydrocarbon conversion at hydrocarbon conversion conditions. Materials known as zeolites or molecular sieves are one preferred class of synthetic crystalline materials. Useful zeolites include not only synthetic zeolites, but also naturally occurring zeolites the chemical make-up of which is modified or changed to enhance one or more of the catalytic properties of the naturally occurring zeolites. Certain synthetic crystalline materials are discussed in U.S. Pat. Nos. 4,310,440; 4,440,871; 4,500,651; and 4,503,023. Virgin catalysts which include a catalytically effective amount of USY zeolite are particularly preferred in the present invention Compositions of the virgin catalysts which are particularly useful in the present invention are those in which the synthetic crystalline materials are incorporated in amounts effective to promote the desired hydrocarbon conversion, e.g., a catalytically effective amount, into a porous matrix which comprises, for example, amorphous material which may or may not be itself capable of promoting such hydrocarbon conversion. Included among such matrix materials are clays and amorphous compositions of alumina, silica, silica-alumina, magnesia, zirconia, mixtures of these and the like. The synthetic crystalline material is preferably incorporated into the matrix material in amounts within the range of about 1% to about 75%, more preferably about 2% to about 50%, by weight of the total catalyst. The preparation of crystalline-amorphous matrix catalytic materials is described in U.S. Pat. No. 3,140,253 and U.S. Pat. No. Re. 27,639. Catalytically active synthetic crystalline materials which are formed during and/or as part of the methods of manufacturing the catalyst are within the scope of the present invention.

The virgin catalysts useful in the catalytic hydrocarbon cracking embodiment of the present invention may be any conventional catalyst capable of promoting hydrocarbon cracking at the conditions present in the reaction zone, i.e., hydrocarbon cracking conditions, and preferably containing at least one of the above-noted synthetic crystalline materials. Similarly, the catalytic activity of such catalysts is restored at the conditions present in a conventional cracking unit regeneration zone. Typical among these conventional catalysts are those which comprise alumina, silica and/or silica-alumina, and preferably at least one synthetic crystalline material, e.g., aluminosilicate, having pore diameters of about 8 Angstroms to about 15 Angstroms and mixtures thereof. When the virgin catalyst to be used in the hydrocarbon cracking embodiment of the present invention contains crystalline aluminosilicate, the crystalline aluminosilicate may, prior to the treating of the present invention, include minor amounts of conventional metal promoters such as the rare earth metals, in particular cerium.

The physical form of the virgin catalyst is not critical to the present invention and may, for example, vary with the type of hydrocarbon conversion process in which it will be used. The virgin catalyst may be useful as a fixed bed or in a circulating system. In a fixed-bed process, a single reaction zone or a series of catalytic reaction zones may be used. If a series of reactors are used, one is usually on stream and others are in the process of cleaning, regeneration, etc. In circulating catalyst systems, such as those of the fluid bed or moving bed catalytic processes, catalyst moves through a reaction zone and then through a regeneration zone. In a fluid bed cracking process, gases are used to convey the catalyst and to keep it in the form of a dense turbulent bed which has no definite upper interface between the dense (solid) phase the suspended (gaseous) phase mixture of catalyst and gas. This type of processing requires the catalyst to be in the form of a fine powder, e.g., a major amount by weight of which being in a size range of about 20 to 150 microns. In other processes, e.g., moving bed catalytic cracking system, the catalyst can be in the form of macrosize particles such as spherical beads which are conveyed between the reaction zone and the catalyst regeneration zone. These beads may range in size up to about ½ inch in diameter. When fresh, the minimum size bead is preferably about ⅛ inch in diameter. Other physical forms of virgin catalyst such as tablets, extruded pellets, etc. can be used.

The present virgin catalyst treatment process comprises reductive washing and oxidative washing. These washes may be provided alternately or several reductive washes may be followed by several oxidative washes. When alternating washes are used, the final wash is preferably an oxidative wash to leave the washed virgin catalyst in the best form for hydrocarbon conversion, e.g., cracking. As used herein, "reductive" wash refers to a wash with a medium, preferably an aqueous solution, containing a reducing agent or an agent which may give up electrons. Similarly, "oxidative" wash refers to a wash with a medium, preferably an aqueous solution, containing an oxidizing agent or an agent which may accept electrons. Moreover, "wash" refers to a treatment which preferably is accomplished by contacting the virgin catalyst with the wash medium for a time sufficient to cause an interaction between the medium and catalyst thereby resulting in a washed virgin catalyst having at least one improved catalytic property. The washing may be a batch operation, a semicontinuous operation or a continuous operation. Thus, a "wash" may include merely stirring in a batch vessel or a complex series of counter current contactors or continuous contactors.

A preferred reductive wash medium comprises a solution of sulfur dioxide or compounds capable of producing sulfur dioxide such as sulfides and bisulfites in an acidic aqueous medium. A reductive wash with the preferred reducing agents do not require a subsequent oxidative wash. Other reducing agents which may be used include hydrogen, arbon monoxide, hydrogen sulfide, oxalic acid or salts thereof, hydrazine and hydrazine derivatives, borane, diborane, borohydrides, metallic aluminum hydrides, sulfites, thiosulfates, dithionites, hydrothionites, poly-thionites and the like. Of these other reducing agents, hydrogen, carbon monoxide, hydrogen sulfide, hydrazine, and hydrazine derivatives, borane, diborane, borohydrides, metallic aluminum hydrides, sulfites, thiosulfates, dithionites, hydrothionites, polythionites and mixtures thereof are particularly Suitable. Sulfur dioxide is a particularly preferred reducing agent.

Reductive washes with sulfur dioxide are preferably effected at conditions to inhibit oxidation of the sulfur dioxide, e.g., is the absence of oxygen. In addition, reductive washes with sulfur dioxide provide for improved solubility and removal of elemental sulfur which may have been deposited on the virgin catalyst during contact with a sulfur-containing agent, as is described hereinafter. By way of example of a preferred reductive wash, an aqueous solution saturated with sulfur dioxide to form a sulfur oxide hydrate (i.e., $SO_2.xH_2O$) is prepared at about 0° to about 20° C., preferably about 5° C. to about 15° C., by bubbling sulfur dioxide through water. An aqueous virgin catalyst slurry e.g., about 10% to about 50% and preferably about 15% to about 25% by weight of virgin catalyst, is prepaared and heated to a temperature of about 60° C. to about 95° C., preferably about 65° C. to about 80° C. The sulfur dioxide saturated solution is then added to the catalyst slurry in an amount sufficient to give an initial pH of the system in the range of about 2.0 to about 3.5 and preferably about 2.5 to 3.0. Preferably, about 0.1 to about 10 volumes of sulfur dioxide saturated solution per volume of catalyst are used during the wash. After the contacting has occurred for about 0.5 to about 10 minutes, preferably about 1 to about 5 minutes, preferably under an inert atmosphere, the reductively washed virgin catalyst can be separated, e.g., by filtration or decanting. Long contact times, i.e., in excess of about 15 minutes, preferably not to exceed about 10 minutes, are preferably avoided to avoid oxidation of the sulfur dioxide should the wash be effected in a manner where air and oxygen are not intentionally excluded. This reductive wash step can be followed by a water wash.

The reductive wash may be directly followed by an oxidative wash. A preferred oxidative wash medium comprises a solution of hydrogen peroxide in water. Other oxidizing agents which may be used include air, oxygen, ozone, perchlorates, organic hydroperoxides, organic peroxides, organic peracids, inorganic peroxyacids such as peroxymonosulfuric and peroxydisulfuric acid, singlet oxygen, $NO_2$, $N_2O_4$, $N_2O_3$, superoxides and the like. Typical examples of organic oxidants are hydroxyheptyl peroxide, cyclohexanone peroxide, tertiary butyl peracetate, di-tertiary butyl diperphtalate, tertiary butyl perbenzoate, methyl ethyl ketone peroxide, dicumyl peroxide, tertiary butyl hydroperoxide, di-tertiary butyl peroxide, p-methyl benzene hydroperoxide, pinane hydroperoxide, 2,5-dimethylhexane-2,5-dihydroperoxide, cumene hydroperoxide and the like; as well as organic peracids such as performic acid, peracetic acid, trichloroperacetic acid, perchloric acid, periodic acid, perbenzoic acid, perphthalic acid and the like including salts thereof. Ambient oxidative wash temperatures can be used, but temperatures of about 150° F. to the boiling point of the medium, e.g., the aqueous medium, in combination with agitation may be helpful. Preferred temperatures are about 65° to about 95° C. Pressure above atmospheric may be used but the results usually do not justify the additional equipment. Contact times for the virgin catalyst/oxidative wash medium are preferably in the range of about 0.1 minutes to about 30 minutes, more preferably about 0.5 minutes to about 10 minutes and still more preferably about 1 minute to about 5 minutes. Both the reductive washing and the oxidative washing preferably are each conducted for a period not to exceed about 15 minutes.

As indicated, preferably the sulfur dioxide reductive wash is followed by a hydrogen peroxide-water oxidative wash. The hydrogen peroxide solution preferably containing about 2% to about 30% by weight of hydrogen peroxide, can be added to an aqueous reductively washed virgin catalyst slurry as described earlier at about 65° to about 95° C., preferably 60° to about 85° C. The preferred concentration of hydrogen peroxide is in the range of about 5 lbs. to about 50 lbs., more preferably about 10 lbs. to about 20 lbs. per ton of virgin catalyst. Additional oxidative washes can be used to provide further benefits. In addition, the oxidative washing can be carried out either in the presence of or absence of a mineral acid such as HCl, $HNO_3$ or $H_2SO_4$. Preferably, the pH of the oxidative wash medium is about 2 to about 6.

After the virgin catalyst is washed, the catalyst slurry can be filtered to give a cake. The cake may be reslurried one or more times with water or rinsed in other ways, such as, for example, by a water wash of the filter cake.

After the washing and rinsing treatment, the treated virgin catalyst may be transferred to a hydrocarbon conversion system, for instance, to a catalyst regenerator. The virgin catalyst may be transferred as a slurry in the final wash medium, or it may be desirable first to dry the catalyst filter cake or filter cake slurry at, for example, about 215° to 320° F., under a vacuum. Also, prior to using the treated virgin catalyst in the conversion operation it can be calcined, for example, at temperatures usually in the range of about 700° F. to about 1300 F. The treated virgin catalyst may also be slurried with hydrocarbons and added to the reactor vessel, if desired.

The virgin catalyst may be subjected to one or more pretreatments prior to the reductive/oxidative washing described herein. For example, the virgin catalyst may be contacted with steam at conditions effective to reduce the catalytic activity of the virgin catalyst. Also, the virgin catalyst may be contacted with at least one sulfur-containing component to increase the sulfur content of the virgin catalyst. Suitable sulfur-containing components include elemental sulfur vapors and, more conveniently volatile sulfides, (including one or more components capable of generating volatile sulfide at the contacting conditions), such as hydrogen sulfide, carbon disulfide or a mercaptan. Contacting conditions include elevated temperatures preferably in the range of about 500° F. to about 1700° F., more preferably about 800° F. to about 1400° F., and a sulfiding vapor partial pressure preferably of about 0.05 to about 30 atmospheres, or more preferably of about 0.2 to about 25 atmospheres. Hydrogen sulfide is the preferred sulfiding agent. Pressures below atmospheric can be obtained either by using a partial vacuum or by diluting the vapor with a gas such as hydrogen or nitrogen. Particularly preferred are mixtures of hydrogen sulfide with hydrogen and/or carbon monoxide and/or carbon dioxide. The time of contact varies on the basis of the temperature and pressure chosen and other factors such as the degree of increase in virgin catalyst sulfur content desired. Such sulfiding agent/virgin catalyst contacting may run for up to about 20 hours or more, preferably about 0.25 hours to about 20 hours depending on the conditions and the virgin catalyst sulfur content desired. Temperatures in the range of about 900° F. to about 1350° F. and pressures of approximately 1 atmosphere or less are especially preferred. More preferably such contacting continues for at least about 1 to 2 hours but the time may depend upon the manner of contacting the virgin catalyst and sulfiding agent, e.g., batch or continuous, as well as the rate of diffusion within the catalyst matrix.

The sulfur-containing virgin catalyst is preferably contacted with an oxidizing agent at conditions effective to oxidize at least a portion of the sulfur content of the virgin catalyst. For example, exposure of the sulfur-containing virgin catalyst to molecular oxygen, preferably at a temperature in the range of about 525° F. to about 725° F. oxidizes at least a portion of the sulfur on the virgin catalyst. Oxidation can be performed using either a gaseous or liquid phase oxidizing agent.

The virgin catalyst, e.g., the sulfur-containing virgin catalyst, may be contacted with at least one halogen-containing component to form a halogenated virgin catalyst. Preferably, the halogen is chlorine. The halogenation preferably takes place in the vapor phase, at moderately elevated temperatures up to about 700° F. or even up to about 900° F. or about 1000° F., wherein the virgin catalyst composition and structure is not materially harmed by the treatment. Chlorination of the virgin catalyst preferably takes place at a temperature of at least about 300° F., more preferably about 550° F. to about 650° F.

The chlorinating agent or mixture is preferably substantially anhydrous, that is, if the agent or mixture were to be in the liquid state no separate aqueous phase would be observed. As the amount of water in the chlorinating agent increases, additional time and/or chlorinating agent may be required to obtain a given amount of chlorination. This inhibiting effect is also evident when water is present in the virgin catalyst so that it is preferred that the catalyst contain less than about 1% or about 2% volatile matter, that is, matter which is removable by heating to 1000° C. A pressure of about 0 to about 100 or more psig., preferably about 0 to about 15 psig. may be maintained during chlorination. The virgin catalyst/chlorinating agent or mixture contacting usually lasts for at least about five minutes, preferably about 15 minutes to about 2 hours, but shorter or longer contacting times may be possible or needed.

The chlorinating mixture preferably contains a chlorinating agent and a gaseous inert diluent. The chlorinating agent may be a vaporizable covalent compound of chlorine with carbon or sulfur. The carbon compounds of chlorine which may be employed are generally the chlorine-substituted light hydrocarbons which may be introduced to the contacting zone as such or may be produced during the contacting from a mixture of chlorine gas with low molecular weight hydrocarbons. Preferably the carbon compound of chlorine employed is carbon tetrachloride. Useful inorganic sulfur-containing compounds include the volatizable sulfur chlorides, such as sulfur monochloride, sulfur dichloride, thionyl chloride and sulfuryl chloride.

The gaseous inert diluent, the other component of one preferred chlorinating mixture, may advantageously be nitrogen or any other gas inert under the contacting conditions. However, it is preferable to avoid the use of inert gases containing hydrocarbons, even in small amounts.

A chlorine-containing component selected from the group consisting of molecular chlorine, hydrogen chloride and mixtures thereof, particularly in combination with one or more of the covalent chlorinating agents described above, may advantageously be employed as at least part of the chlorinating agent. The covalent chlorinating agent may be provided in lesser amounts when molecular chlorine or HCl is present. Molecular chlorine and HCl are often considerably less expensive than carbon tetrachloride or certain other useful agents and thus a combination of such covalent chlorinating agents and molecular chlorine or HCl may be economically attractive.

If employed, the vaporizable covalent carbon or sulfur compounds of chlorine are preferably used in the amount of about 0.5 to about 50 percent, more preferably about 1 to about 10 percent, based on the weight of the virgin catalyst. The amount of the agent may vary, however, depending upon the manipulative aspects of the chlorination step, for example, a batch treatment may sometimes require more agent than a continuous treatment for the same degree of effectiveness and results.

When molecular chlorine or HCl are employed as at least part of the chlorinating agent they are supplied in amounts preferably in the range of about 0.5% to about 150%, more preferably about 2% to about 35% based on the weight of the virgin catalyst. The gaseous inert diluent advantageously is used in amounts of about 1% to about 25%, more preferably about 2% to about 15%, based on the weight of the virgin catalyst treated.

The virgin catalyst may be calcined, preferably in the presence of molecular oxygen-containing gas at temperatures preferably higher than about 1300° F., more preferably at temperatures in the range of about 1350° F. to about 1800° F. but below a temperature where the virgin catalyst undergoes any substantial deleterious change in its physical or chemical characteristics. The virgin catalyst is preferably in a substantially carbon-free condition during this high temperature treatment.

The duration of the oxygen treatment preferably is in the range of about a quarter of an hour to about four hours or more. The oxygen-containing gas used in the treatment preferably contains molecular oxygen and there is preferably little significant consumption of oxygen in this treatment. The gas may be oxygen, or a mixture of oxygen with inert gas, such as air or oxygen-enriched air. The partial pressure of oxygen in the treating gas may range widely, for example, from about 0.1 to 30 atmospheres. The factors of time and oxygen partial pressure may be chosen with a view to the most economically feasible set of conditions. It is preferred to continue the oxygen treatment for at least about 15 or 30 minutes with a gas containing at least about 1% by volume, preferably at least about 10% by volume, of oxygen.

After each one and/or all of the above-noted pretreatment steps, the virgin catalyst may be contacted or washed in a liquid aqueous composition, e g., to remove sulfur, halogen, and/or oxygen-containing components from the virgin catalyst.

The water used is sometimes distilled or deionized prior to contact with the virgin catalyst. However, the aqueous medium can contain extraneous ingredients in trace amounts, so long as the medium is aqueous-based and the extraneous ingredients do not adversely affect the properties of the virgin catalyst. Temperatures of about 150° F. to the boiling point of water are helpful in increasing the solubility of the components to be removed. Temperatures above 212° F. and elevated pressures may be used but the results do not seem to justify the added equipment.

Any or all of these "pretreatment" washings may be performed using a reductive wash medium, which is preferably followed by an oxidative wash.

After the virgin catalyst is reductively and oxidatively washed as described herein, the washed virgin catalyst slurry may be (1) contacted with at least one ammonium ion-containing component to increase the ammonium ion content of the virgin catalyst; and/or (2) contacted with at least one rare earth metal ion-containing component to increase the rare earth metal ion content of the catalyst.

In certain embodiments of the present invention, the virgin catalyst is contacted with at least one ammonium ion-containing component to increase the ammonium ion content of the catalyst. Although the specific conditions of this contacting may vary widely, this contacting is preferably carried out at conditions effective to ion exchange ammonium ions onto the virgin catalyst.

The conditions for the ammonium ion, virgin catalyst contacting should, of course, be chosen so that the physical and chemical structure and make-up of the catalyst is not unduly, detrimentally affected. In one embodiment, the virgin catalyst is contacted with a medium containing ammonium ions, preferably at a pH in the range of about 4 to about 7, more preferably about 4 to about 6.

The medium, preferably an aqueous medium, is preferably substantially free, before contact with the virgin catalyst, of any contaminant materials which would remain deposited on the catalyst. Such contaminant materials include the alkali metals, as well as other contaminant metals. The ammonium ions may be $NH_4^+$ ions or organic-substituted $NH_4^+$ ions such as methyl ammonium and quartenary hydrocarbon radical ammoniums. The contact material containing ammonium ion can be prepared by addition of a dry reagent or a concentrated solution of the reagent to water, preferably distilled or deionized water.

The reagent may be any water-soluble organic or inorganic ammonium compound such as ammonium carbonate, sulfate, nitrate, chloride, fluoride, citrate, tartarate, acetate and the like. An aqueous solution of such ammonium salts is highly preferred. The selected solute is preferably one which dissociates or ionizes in the aqueous medium and which can be washed away or which vaporizes or decomposes to vaporizable materials under catalyst regeneration or similar high temperature treatment.

The amount of ammonium ion in the medium is sufficient to give the desired increase in ammonium ion, preferably exchanged ammonium ion, content of the virgin catalyst. In one embodiment, the maximum level of ammonium ion exchange depends on, for example, the pH of the ammonium ion-containing medium, concentration of ammonium ion and surface properties, e.g., surface area, and number of ion exchangeable sites, of the catalyst. Preferably, the amount of ammonium ion exchanged is in the range of about 1 to 500 or more pounds per ton of virgin catalyst treated. About 10 to about 300 pounds per ton of virgin catalyst is the more preferred ammonium ion concentration range. The temperature of this contacting may vary within wide limits. The preferred aqueous medium may be at room temperature or below, or may be higher. The temperature, of course, should not be so high and the contact should not be so long as to seriously harm the virgin catalyst. The time of contact also may vary within wide limits, so long as thorough contact between the catalyst and the medium is assured. Very short contact times, for example, about 10 to about 30 minutes, may be satisfactory, while the time of contacting may last about 2 to about 5 hours or longer. Contacting pressure may vary widely. Preferably the pressure is in the range of about 0.1 atmospheres to about 30 or more atmospheres. Performing this contacting at about atmospheric pressure provides acceptable results. Such ammonium ion contacting, e.g., ion exchange, can be performed as a batch, semi-continuous or continuous operation in a column or other vessel.

In the event ion exchange is desired during the ammonium ion/catalyst contacting, any one of many well known ion exchange procedures or techniques may be utilized. Such ion exchange is preferred. The ion exchange medium and conditions should be chosen to avoid unduly harming the virgin catalyst. Temperature, pressure, pH and contact time conditions are preferably similar to those identified above. Care should be taken to avoid undue problems in separating the virgin catalyst from the ion exchange medium. The catalyst is brought into contact with the ion exchange medium to effect the desired ion exchange. Any suitable ion exchange medium may be employed. Preferably, the ion exchange medium comprises an aqueous solution containing ammonium ions adapted to exchange ammonium ions for ions on the virgin catalyst.

After the ammonium ion/virgin catalyst contacting, the catalyst can be filtered and then slurried with water or rinsed in other ways, such as, for example, by a water wash on the filter, and the rinsing may be repeated, if desired, several times. A repetition of the ammonium ion/virgin catalyst contacting without other treatments appears to have little beneficial effect if the first such contacting is properly, e.g., thoroughly, conducted.

If desired, the ammonium ion contacted virgin catalyst may be dried. This dried solid composition can be placed directly into hydrocarbon conversion service or can be calcined, preferably in air at a temperature of about 500° F. to about 1500° F. for a time of about 0.1 hours to about 12 hours or more, and then placed into hydrocarbon conversion service. The ammonium ion contacted virgin catalyst need not be dried or calcined prior to being subjected to contacting with rare earth metal ion.

In certain embodiments of the present invention, the washed virgin catalyst, either without prior ammonium ion contacting or after ammonium ion contacting, e.g., as described above, is contacted with at least one rare earth metal ion-containing component to increase the amount of rare earth metal ion on the catalyst. Although the specific conditions of this contacting may vary widely, this contacting is preferably carried out at conditions effective to ion exchange rare earth metal ions onto the virgin catalyst. Any one or any mixture of the lanthanide series of metals may be employed as the rare earth metal. Cerium, lanthanum and mixtures thereof are preferred. Cerium is a more preferred rare earth metal.

The conditions for the rare earth metal ion/virgin catalyst contacting should, of course, be chosen so that the physical and chemical structure and make-up of the catalyst is not unduly, detrimentally affected. In one embodiment, the catalyst is contacted with a medium, preferably an aqueous medium, containing rare earth metal ions, preferably at a pH in the range of about less than 1 to about 5, more preferably about 2 to about 4. The medium is preferably substantially free, before contact with the catalyst, of any contaminant materials which would remain deposited on the catalyst. The rare earth metal ions can be derived from the solution of water soluble inorganic or organic rare earth metal salts, for example, halides, sulfates, nitrates, acetates and the like. The contact material containing rare earth metal ions can be prepared by addition of a dry reagent or a concentrated solution of the reagent in water, preferably distilled or deionized water.

The amount of rare earth metal ion contacted with the catalyst may vary over a wide range depending, for example, on the desired final concentration of rare earth metal on the catalyst after the treating process of the present invention. Preferably, the concentration of rare earth metal on the catalyst is increased by an amount in the range of about 0.01% to about 20%, more preferably about 0.05% to about 5%, by weight, calculated as elemental rare earth, based on the virgin catalyst after the present treating process.

The temperature of the rare earth metal ion/virgin catalyst contacting can vary widely. Preferred temperatures include those within the range of about 32° F. to about 300° F., more preferably about 50° F. to about 200° F. Performing this contacting at or about ambient temperature provides acceptable results. Contacting pressure is not narrowly critical, and preferably is in the range of about 0.1 atmospheres to about 30 or more atmospheres. Performing this contacting at or about ambient or atmospheric pressure provides acceptable results. Rare earth metal ion/virgin catalyst contacting time also may vary widely. This contacting time is preferably in the range of about 1 minute to about 5 or more hours, more preferably about 5 minutes to about 2 hours. Such rare earth metal ion/virgin catalyst contacting, e.g., ion exchange, can be performed as a batch, semi-continuous or continuous operation in a column or other vessel.

As with the ammonium ion/virgin catalyst contacting, any one of many well known ion exchange procedures or techniques may be utilized if ion exchange is desired during the rare earth metal ion/virgin catalyst contacting. Such ion exchange is preferred. The ion exchange medium and conditions should be chosen to avoid unduly harming the catalyst. Temperature, pressure, pH and contact time conditions are preferably similar to those identified above. Care should be taken to avoid undue problems in separating the virgin catalyst from the ion exchange medium. The virgin catalyst is brought into contact with the ion exchange medium to effect the desired ion exchange. Any suitable ion exchange medium may be employed. Preferably, the ion exchange medium comprises an aqueous solution containing the desired rare earth metal ions to exchange rare earth metal ions onto the virgin catalyst.

After the rare earth metal ion/virgin catalyst contacting, the virgin catalyst can be filtered, washed, e.g., with an aqueous medium to remove extraneous ions and/or to adjust the rare earth metal content of the catalyst, and dried. At this point, the dried virgin catalyst, including an increased concentration of rare earth metal, can be placed directly into hydrocarbon conversion service or can be calcined, preferably in air at a temperature of about 500° F. to about 1500° F. for a time of about 0.1 hours to about 12 hours or more, and then placed into hydrocarbon conversion service. Alternately, the rare earth metal ion/virgin catalyst contacting can be repeated, if necessary or desired to achieve still further benefits, e.g., further increased concentrations of rare earth metal on the virgin catalyst.

The ammonium ion exchange and/or rare earth metal ion exchange embodiments of the present invention are of particular advantage when the virgin catalyst comprises at least one synthetic crystalline material, e.g., zeolite, capable of promoting hydrocarbon conversion, e.g., hydrocarbon cracking.

Although the ammonium ion/virgin catalyst contacting and rare earth metal ion/virgin catalyst contacting may occur simultaneously, preferably, if both contactings are to be employed, the contactings occur separately, more preferably with the ammonium ion contacting occurring prior to the rare earth metal ion contacting.

The treated virgin catalyst may be transferred to a hydrocarbon conversion system, for instance, to a catalyst regenerator. The treated virgin catalyst may be transferred as a slurry, or it may be desirable first to dry the catalyst, for example, at a temperature in the range of about 215° F. to about 320° F. Also, prior to using the treated virgin catalyst in the hydrocarbon conversion operation it can be calcined, for example, at temperatures preferably in the range of about 700° F. to about 1300° F. Preferably, the treated virgin catalyst is not calcined at a temperature higher than the temperature present during catalyst regeneration, e.g., in the catalyst regeneration zone, prior to using the catalyst in the hydrocarbon conversion operation. Such high temperature calcination has been found to reduce the catalytic effectiveness of the catalyst. The treated virgin catalyst may be slurried with hydrocarbons and added to the reactor vessel, if desired.

In this invention the substantially hydrocarbon oils utilized as feedstock for a given conversion process may be of any desired type normally utilized in such hydrocarbon conversion operations. The feedstock may contain alkali metals nickel, iron, copper and/or vanadium as well as other metals.

The present invention is particularly suitable for treating virgin catalysts utilized in the catalytic cracking of reduced or topped crude oils to more valuable products such as illustrated in U.S. Pat. Nos. 3,092,568 and 3,164,542, each of which patents is incorporated in its entirety herein by reference. Similarly, this invention is applicable to processing shale oils, tar sands oil, coal oils and the like.

The following non-limiting examples illustrate certain aspects of the present invention.

EXAMPLES 1 TO 4

A mass of virgin fluid catalytic cracking catalyst was obtained for testing. This catalyst was commercially manufactured and contained a catalytically effective amount, e.g., about 18% by weight, of rare earth metal ion-exchanged USY synthetic zeolite. The catalyst had not previously been used in any hydrocarbon conversion service.

One portion of this virgin catalyst was subjected to steaming to reduce the initial catalytic activity of the catalyst.

Another portion of the virgin catalyst and a portion of the steamed catalyst were each subjected to the following procedure.

The following vessel was used in certain of the procedures. A two inch i.d. by eighteen inch long quartz vessel fitted with a coarse quartz frit was used as a reactor vessel. One inch i.d. by ten inch long extensions were positioned at either end of this reactor vessel and terminated in ball joints which allowed quick disconnecting of the entire assembly, if desired. Heat to the fluid bed reactor vessel was supplied by a Lindberg Model 54442-D furnace. Heat tracing of entry and exit gases was effected by external heat tape wrapping.

The catalyst was subjected to calcining at a temperature of 1330° F. to 1350° F. for 4 hours in an air atmosphere.

While at 1350° F., the catalyst was flushed with nitrogen. After this nitrogen flush, the catalyst was fluidized with 100% H₂S for four hours. Following this sulfiding step, the reactor vessel and contents were cooled to 650° F. under nitrogen fluidization. The catalyst bed was then fluidized with 100 chlorine gas for 90 minutes at 650° F. Following the chlorination, the reactor was flushed with nitrogen for fifteen minutes while maintaining a temperature of about 650° F. This nitrogen purge removed some chlorine from the void space in the catalyst bed.

The hot chlorinated catalyst was cooled to ambient temperature, i.e., about 70° F., and contacted with a liquid water wash. The catalyst/water slurry was filtered on a Buchner funnel, and oven dried at 230° F. overnight.

This pretreated virgin catalyst was then slurried with water and sufficient sulfur dioxide was added to give an initial pH of about 2.0. The temperature was maintained at about 70° F. for about 3 minutes. The catalyst was then filtered and the aqueous sulfur dioxide wash was repeated twice more to give a total of 3 reductive washes.

The catalyst was then slurried with water and hydrogen peroxide at a rate of about 10–40 pounds/ton of catalyst was added. The initial temperature was about 175° F. and the wash was carried out for 3 minutes. The hydrogen peroxide wash was repeated once more to give total of two oxidative washes. The catalyst was then washed with water, filtered and then dried under a vacuum at about 230° F. overnight.

The washed catalyst was contacted with an aqueous solution of an ammonium salt at ambient temperature and at an initial pH of about 4 to 7. The weight ratio of catalyst to solution was about 1:4–20. The contacting continued for 1 hour. The catalyst was then filtered, washed with water and refiltered. The catalyst is then oven dried at 230° F. overnight.

The virgin, steamed, treated virgin and treated steamed catalysts were each tested for catalytic activity using the Micro Activity Test (ASTM D 3907-80). Results of these tests are shown in Table 1.

TABLE 1

| Example | Catalyst | MAT NO. | Gasoline, wt. % | Coke Factor | Coke Factor |
|---|---|---|---|---|---|
| 1 | Virgin | 82.3 | 66.09 | 13.61 | 2.57 |
| 2 | Steamed | 75.5 | 69.53 | 4.51 | 1.43 |
| 3 | Treated Virgin | 80.7 | 69.15 | 8.61 | 2.90 |
| 4 | Treated Steamed | 78.3 | 70.27 | 5.36 | 2.68 |

These results demonstrate clearly certain of the outstanding benefits of the present invention. For example, by comparing Example 3 with Example 1, a virgin catalyst treatment procedure in accordance with the present invention is shown to improve the gasoline yield while advantageously reducing the coke and gas producing factors. The gasoline yield of the treated virgin catalyst is substantially similar to the steamed catalyst (Example 2) while the MAT No. is increased. Treating a steamed virgin catalyst in accordance with the present invention (Example 4) increases the MAT No. and gasoline yiel relative to the steamed catalyst (Example 3).

EXAMPLES 5 AND 6

Catalysts treated in accordance with procedures described in Examples 3 to 4 are included in the circulating catalyst inventory of a commercial fluid bed catalytic cracking unit processing substantially hydrocarbon feedstock containing 500 ppm. by weight of vanadium and about 50 ppm by weight of nickel. Over a period of time, it is determined that each of these catalysts perform satisfactorily in this commercial operation.

While this invention has been described with respect to various specific examples and embodiments, it is to be understood that the invention is not limited thereto and that it can be practiced within the scope of the following claims.

The embodiments of the present invention in which an exclusive property or privilege is claimed are as follows:

1. A process for treating a virgin catalyst useful to promote hydrocarbon conversion at hydrocarbon conversion conditions comprising:
   (a) contacting said virgin catalyst with a liquid reductive wash medium; and
   (b) contacting said reductively washed virgin catalyst with a liquid oxidative wash medium, thereby producing a washed virgin catalyst with at least one improved catalytic property.

2. The process of claim 1 wherein said virgin catalyst contains a catalytically effective amount of at least one synthetic crystalline material.

3. The process of claim 1 wherein said virgin catalyst is useful to promote hydrocarbon catalytic cracking.

4. The process of claim 1 which further comprises at least one of the following:
   (1) contacting said washed virgin catalyst with at least one ammonium ion-containing component to increase the the ammonium ion content of said washed virgin catalyst; and
   (2) contacting said washed virgin catalyst with at least one rare earth metal ion-containing component to increase the rare earth metal ion content of said washed virgin catalyst.

5. The process of claim 1 wherein prior to step (a) said virgin catalyst is calcined at a temperature higher than about 1300° F.

6. The process of claim 5 wherein said calcined virgin catalyst is contacted with an aqueous liquid prior to step (a).

7. The process of claim 1 wherein prior to step (a) said virgin catalyst is contacted with steam to reduce the catalytic activity of said virgin catalyst.

8. The process of claim 1 wherein prior to step (a) said virgin catalyt is contacted with at least one halogen-containing component to form a halogenated virgin catalyst.

9. The process of claim 8 wherein said halogen is chlorine.

10. The process of claim 1 wherein prior to step (a) said virgin catalyst is contacted with at least one sulfur-containing component to increase the sulfur content of said virgin catalyst and said sulfur-containing virgin catalyst is contacted with an oxidizing agent to oxidize at least a portion of the sulfur content of said virgin catalyst.

11. The process of claim 10 wherein said oxidized virgin catalyst is contacted with an aqueous liquid prior to step (a).

12. The process of claim 11 wherein said oxidizing agent comprises a chlorine-containing component.

13. The process of claim 1 wherein prior to step (a) said virgin catalyst is calcined at elevated temperature, said calcined virgin catalyst is contacted with at least one sulfur-containing component to increase the sulfur content of said virgin catalyst, said sulfur-containing virgin catalyst is contacted with at least one chlorine-containing component to form a chlorinated virgin catalyst, and said chlorinated virgin catalyst is contacted with an aqueous liquid to reduce the chlorine content of said virgin catalyst.

14. The process of claim 13 which further comprises contacting said washed catalyst with at least one ammonium ioncontaining component to increase the ammonium ion content of said washed catalyst.

* * * * *

UNITED STATES PATENT AND TRADEMARK OFFICE
CERTIFICATE OF CORRECTION

PATENT NO. : 4,806,512

DATED : February 21, 1989

INVENTOR(S) : Frank J. Elvin

It is certified that error appears in the above-identified patent and that said Letters Patent is hereby corrected as shown below:

Column 16, line 5; delete "ioncontaining" and insert in place thereof -- ion-containing --.

Signed and Sealed this

Twenty-fifth Day of July, 1989

Attest:

DONALD J. QUIGG

Attesting Officer

Commissioner of Patents and Trademarks